(12) United States Patent
Golde (10) Patent No.: US 6,230,159 B1
(45) Date of Patent: May 8, 2001

(54) METHOD FOR CREATING OBJECT INHERITANCE

(75) Inventor: Peter Hellmut Golde, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/846,349

(22) Filed: Apr. 30, 1997

(51) Int. Cl.$^7$ .................................................. G06F 17/30

(52) U.S. Cl. ........................... 707/103; 707/102; 395/683

(58) Field of Search .................................. 707/103, 104, 707/100, 102; 395/683, 671

(56) References Cited

U.S. PATENT DOCUMENTS

| | | | | |
|---|---|---|---|---|
| 5,187,786 | * | 2/1993 | Densmore et al. ....................... | 707/3 |
| 5,291,583 | * | 3/1994 | Bapat ...................................... | 395/705 |
| 5,313,630 | * | 5/1994 | Namioka et al. ...................... | 707/103 |
| 5,515,536 | * | 5/1996 | Corbett et al. ......................... | 395/700 |
| 5,606,661 | * | 2/1997 | Wear et al. ...................... | 395/183.14 |
| 5,613,099 | * | 3/1997 | Erickson et al. ...................... | 709/303 |
| 5,689,709 | * | 11/1997 | Corbett et al. ......................... | 395/683 |
| 5,732,271 | * | 3/1998 | Berry et al. ........................... | 395/683 |
| 5,758,349 | * | 5/1998 | Breslau et al. ........................ | 707/103 |
| 5,784,620 | * | 7/1998 | Isham ................................... | 709/303 |
| 5,787,431 | * | 7/1998 | Shaugnessy ........................... | 707/100 |
| 5,794,030 | * | 8/1998 | Morsi et al. ........................... | 707/1.3 |
| 5,809,507 | * | 9/1998 | Cavanaugh, III ...................... | 707/103 |
| 5,832,496 | * | 11/1998 | Anand et al. .......................... | 707/102 |
| 5,857,100 | * | 1/1999 | Philipps et al. ....................... | 395/671 |
| 5,884,316 | * | 3/1999 | Bernstein et al. ..................... | 707/103 |
| 5,905,987 | * | 5/1999 | Shutt et al. ............................ | 707/103 |
| 5,995,753 | * | 11/1999 | Walker ................................. | 395/702 |

OTHER PUBLICATIONS

Microsoft Corporation, "What is Visual Basic?," *Microsoft Visual Basic Programmer's Guide*, Chapter 1, pp. 3–12 (1991).

Microsoft Corporation, "Setting Properties," *Microsoft Visual Basic Programmer's Guide*, Chapter 7, pp. 57–64 (1991).

Microsoft Corporation, "Attaching Code," *Microsoft Visual Basic Programmer's Guide*, Chapter 8, pp. 65–76 (1991).

Chappell, D., "Introducing ActiveX and OLE," *Understanding ActiveX and OLE*, Chapter 1, Microsoft Press, pp. 1–37 (1996).

Chappell, D., "Persistence," *Understanding ActiveX and OLE*, Chapter 5, Microsoft Press, pp. 107–128 (1996).

Chappell, D., "ActiveX Controls," *Understanding ActiveX and OLE*, Chapter 9, Microsoft Press, pp. 203–235 (1996).

(List continued on next page.)

*Primary Examiner*—Thomas Black
*Assistant Examiner*—Charles L. Rones
(74) *Attorney, Agent, or Firm*—Klarquist Sparkman Campbell Leigh & Whinston, LLP (57) ABSTRACT

An object-oriented interface is used to provide inheritance of object property information. A set of base object classes are created and stored in a persistent object state in non-volatile storage. A set of derived objects are then created using the base object classes and inherited base object property information. Derived object classes are saved in a persistent object state in non-volatile storage as a "delta" or difference between the derived object information and the inherited base object information. Saving only the derived class objects as a delta saves a significant amount of computer resources. When derived object is loaded, the base object class from which the derived object class inherited information is loaded first, then the derived object class delta is loaded. The two step loading process allows any changes made to the base object class to be automatically reflected in the derived object class by inheritance.

33 Claims, 5 Drawing Sheets

OTHER PUBLICATIONS

Chappell, *Understanding ActiveX OLE, A Guide for Developers & Managers*, Microsoft Press 1996, pp. 12–14, 42–45, 64–68.

Denning, *OLE Controls Inside Out*, Microsoft Press, 1995, pp. 3–34.

Custer, *Inside Windows NT*, Microsoft Press, 1993, pp. 49–81.

Orfali et al., *The Essential Distributed Objects Survival Guide*, John Wiley & Sons, Inc., 1996, pp. 22–27, 288–290, 499–452, 536–537.

Brockschmidt, *Inside OLE*, Microsoft Press, 1995, pp. 13–14, 96–99, 133, 141.

Tucker, *The Computer Science and Engineering Handbood*, 1997, CRC Press, Inc., pp. 2037–2065, 2323–2351.

Thomas et al., *Visual Basic HOW–TO*, 1995, Waite Group Press, pp. 22–27, 37–42, 391–402.

Microsoft Visual Basic, Programmer's Guide, Programming System for Windows, Microsoft Corporation, Chptrs. 1, 6 7–8, 1991.

Adam Denning, *OLE Controls Inside Out*, Microsoft Press, pp. 101–103, (1995).

Adam Denning, *OLE Controls Inside Out*, Microsoft Press, pp. 191–197 (1995).

Sheperd et al., *MFC Internals*, Addison–Wesley, pp. 162–173 (1996).

Moss et al., "Approaches to Adding Peristence to Java," Position Paper for the First International Workshop on Peristence and Java, Drymen, Scotland, Sep. 1996, 5 pp. (1996).

Atkinson et al., "An Orthogonally Persistent Java," First International Workshop on Peristence and Java, Drymen, Scotland, Sep. 1996, 10 pp. (1996).

dos Santos et al., "Persistent Java," First International Workshop on Peristence and Java, Drymen, Scotland, Sep. 1996, 22 pp. (1996).

Andrew Hollub, "Roll Your Own Persistence Implementations to Go Beyond the MFC Frontier," Microsoft Systems Journal, 16 pp., available at http://msdn.microsoft.com./library/periodic/period96/S385.htm (Jun. 1996).

Eddon et al., "Visual Basic 5.0 Relieves the Pain and Discomfort of ActiveX Control Creation," Microsoft Systems Journal, 9 pp. http://msdn.microsoft.com/library/periodic/period97/VB5P1.htm (Feb. 1997).

Morrison et al., "Can Java Persist?," First International Workshop on Peristence and Java, Drymen, Scotland, Sep. 1996, 15 pp. (1996).

* cited by examiner

METHOD FOR CREATING OBJECT INHERITANCE

FIELD OF INVENTION

The present invention relates to object-oriented programming. More particularly it relates to inheritance of object information for graphical forms and other objects in object-oriented programming languages.

BACKGROUND AND SUMMARY OF THE INVENTION

Object oriented programming is used to design computer software that is easy to create, cost effective to modify, and reusable. Object-oriented programming objects are pieces of computer software that include object data and information and provide services through "object methods" (also called "object operations" or "object functions"). The object methods typically operate on private data such as instance data or object state data that the object owns. A collection of objects make up an "object class," which is sometimes called an "object type." An object class acts as a template that describes the behavior of sets of objects. An object's implementation is typically encapsulated, and is hidden from public view. Object private instance data can only be accessed by object methods of the object class. Object public instance data is accessed through a public object interface.

Object inheritance allows child object classes to be created from existing parent object superclasses. The child object classes are called subclasses or derived object classes. The subclasses inherit object information (e.g., data and state information) from the parent object superclass. Object models such as the Component Object Model (COM) and the Distributed Component Object Model (DCOM) and others typically support single and multiple object class inheritance. For single inheritance, an object class has exactly one parent. For multiple inheritance, an object class has more than one parent. Abstract object classes are object classes that are inherited by other classes. For object inheritance, object classes typically form a class hierarchy with the object "parent" being an base object class, and the object "children" being derived object classes.

There are many visual programming languages, such as Visual Basic by Microsoft Corporation of Redmond, Washington which use object-oriented components to create graphical user interfaces (GUIs) and graphical forms for organizing, inputting and outputting user data. Visual programming forms are fully functioning objects, with public and private object data and object methods. The visual programming language forms typically contain graphical data for representations of control boxes, title bars, scroll bars, and buttons provided to a user on a display device in a computer system.

The objects which make up a visual programming language form may also provide an object inheritance class hierarchy of graphical forms. There is a base object class form and derived object class forms which inherit information from the base object class form. A base object class form is typically developed to include a generic graphical form with a desired layout of graphical control boxes, title bars, scroll bars, and buttons for a generic programming application (e.g., input/output for a general application). Derived object class forms are then created from the base object class form. Derived object class forms typically include the graphical components of the base object class form with additions for a specific programming application (e.g., input/output to a specific specialized application).

Inheritance in forms and similar visual programming objects is used with a persistent state of the object. Instances of objects including the object data and method tables are typically stored in computer memory which is volatile (i.e., temporary, when a computer is turned off, or an object-oriented process terminates, they are destroyed). Some objects, like form objects, typically need to preserve some of their object state information (e.g., the state of buttons or bars on a form) from instantiation to instantiation of the object. This object state information is carried across object lifetimes as the persistent state of the object. The persistent state of an object is stored in non-volatile storage that does not disappear when the computer is turned off or the object terminates. The non-volatile storage includes storage such as a hard disk, flash memory and other storage mediums that do not lose data when the computer is turned off.

The saved persistent state of an object typically occupies no volatile memory (but may be temporarily stored in volatile memory) and is saved in a non-volatile datastore so that a later instantiation of the same object class can reload the object and recreate the original object in memory. For form objects, the persistent state includes the form level properties, plus the state of sub-objects like controls, pictures, fonts, and so forth.

Object-oriented frameworks, such Object Linking and Embedding (OLE) and ActiveX Controls by Microsoft Corporation of Redmond, Wash., allow base object classes and derived object classes to be saved in a corresponding persistent state in a non-volatile datastore. When a derived object class desires to use the persistent state information, an instance of the derived object class is created, and the object is initialized with the contents of the derived object class persistent state by reading the information from the non-volatile datastore in memory.

There are a number of problems associated with saving and loading of a derived object class from a persistence state. One problem is that changes made to a base object class may not be reflected in any of the derived object classes. For example, if changes are made to a base object class after the derived object classes have been saved in their corresponding persistent states, the base object class changes will not be reflected in the derived object classes. Another problem is that saving all of the derived object class state information wastes considerable amounts of computer resources (e.g., non-volatile storage space) since a derived object class contains all of the base object class information, and information unique to the derived object class.

Another problem associated with the saving and loading of a derived object class from a persistent state is that of connecting sub-objects (e.g., a font or color sub-object) directly to an object or using the sub-object information for inheritance by other objects. For various applications it is desirable to create sub-objects which cannot be inherited, and for other applications it is desirable to create sub-objects which can be inherited by other objects.

It is also sometimes desirable to use a derived object class as a new base object class. The new base object class would contain all of the information in the original base object class and the derived object class. New derived object classes could then be created from the new base object classes with additional specific functionality.

In accordance with an illustrative embodiment of the present invention, the problems associated with the saving and loading of a derived object class with inheritance are overcome. Methods of creating, saving and loading derived object classes with inheritance are provided. The method of creating and saving a derived object class includes creating a derived object class in memory using one or more base object classes, and determining which part of the derived object class is inherited from its base object class, and which part of the derived object class is specific and unique to the derived object class. When the derived object class is saved, the part of the derived object class that is specific to the derived object class (i.e., the difference between the base object class and the derived object class) is saved in the derived object class's persistent state in non-volatile storage. By saving only the difference between the base object class state and the derived object class state, significant computer resources are saved (e.g., non-volatile storage space).

The method of loading a derived object class includes selecting a derived object class, loading a base object class associated with the selected derived object class into memory from its persistent state in non-volatile storage. The saved differences between the base object class and the derived object class are loaded into memory using the derived object class's persistent state from non-volatile storage. By using the two-stage load process, any changes made to the base object class state are automatically reflected in the derived object class state. The saving and loading methods also allow a derived object class to be used to create a new base object class.

A new object-oriented inheritance interface Inheritable is provided with object interface members SetLoadState , SetSaveState, IsPropertyInherited and SetPropertyInherited. However, more or fewer members could also be used. The SetSaveState interface member implements the object creating and saving with inheritance described above. The SetLoadState interface member implements the object loading with inheritance described above. The IsPropertyInherited and SetPropertyInherited interfaces allow specific object properties to be marked and queried for inheritance for objects and sub-objects and will be explained in detail below. The illustrative embodiment of the present invention is used to provide inheritance in graphical forms and other visual programming objects for visual programming languages like Visual Basic. However, the invention is not limited to visual programming forms or objects, or visual programming languages, and can be used in other object-oriented frameworks which allow inheritance by derived object classes from base object classes. The illustrative embodiment of the present invention is also useful for providing object inheritance for object applications created for the Internet or an intranet (e.g., ActiveX control objects).

The foregoing and other features and advantages of an illustrative embodiment of the present invention will be more readily apparent from the following detailed description, which proceeds with reference to the accompanying drawings.

DETAILED DESCRIPTION OF AN ILLUSTRATIVE EMBODIMENT

Figure 1:
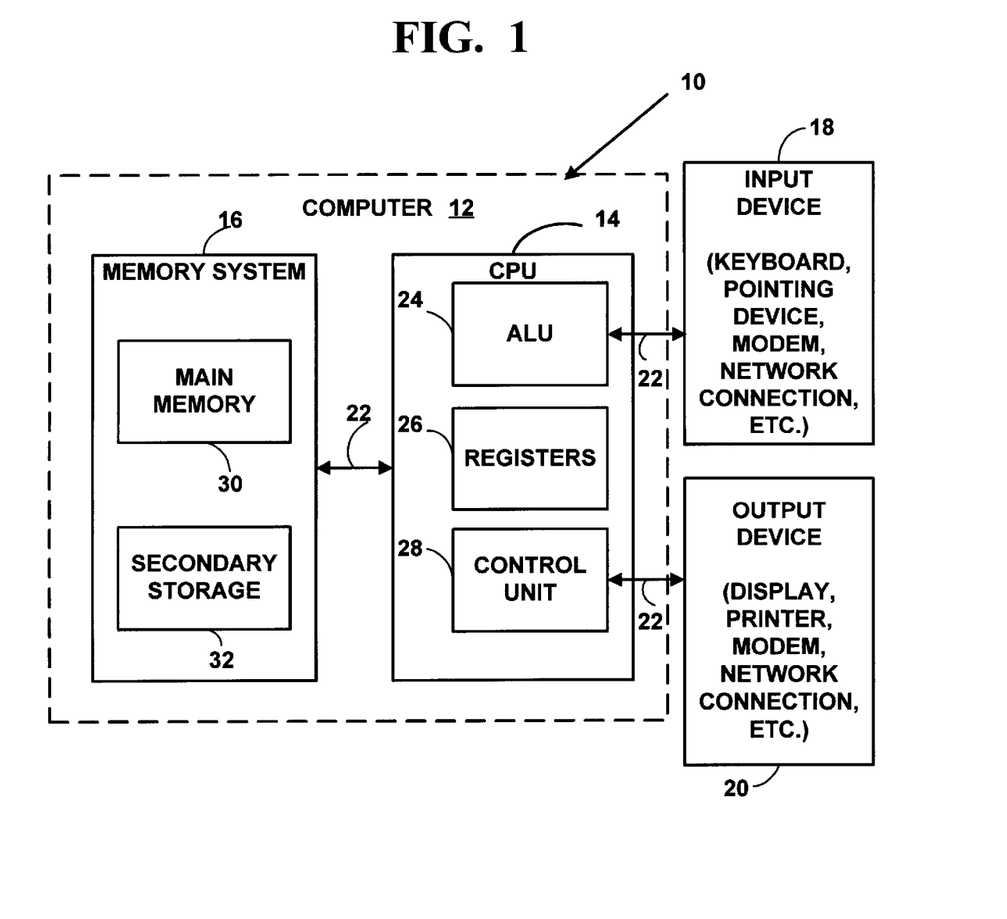
FIG. 1 is a block diagram of a computer system used to implement an illustrative embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment™, Sun™, MIPS™, IBM™, Motorola™, NEC™, Intel™, Cyrix™, AMD™, Nexgen™ and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software instructions which controls the computer system's operation and the allocation of resources. The application program is a set of software instructions that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed or computer-implemented. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote such as those connected by the Internet or an intranet.

In an illustrative embodiment of the present invention, object-oriented techniques are used. An "object type," also called an "object class," comprises a data-type, services that operate on instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e., sometimes known as an object method) defined in the object's class, and a data block, containing the current values for each object variable (i.e., data members, sometimes known as an object property). An application has some reference to an object through an object pointer. An application obtains this object reference by using some type of function call (direct or implied) in which that function allocates an object block in computer memory, initializes the function table, and returns a reference to allocated computer memory to an application. The computer memory may be local or distributed on a remote computer.

The Component Object Model (COM) and Distributed Component Object Model (DCOM) are models used for object oriented programming. The COM and DCOM specify how objects within a single application or between applications (e.g., client/server applications) interact and communicate by defining a set of standard interfaces. Interfaces are groupings of schematically related functions through which a client application accesses the services of a server application.

Object Linking and Embedding (OLE), such as OLE Version 2 by the Microsoft Corporation of Redmond, Wash., and ActiveX Controls are based in part on the Component Object Model and allow the creation of objects of different formats which operate on data through defined interfaces, rather than operating on the applications responsible for the data. ActiveX is based in part on OLE technologies.

OLE and ActiveX allow derived object classes to save and load base object class states. OLE and ActiveX (hereinafter just referred to as OLE for the purposes of simplicity) provide a set of object interfaces: IPeristStorage, IPersistStream, IPersistStreamInit, IPersistFile and IPersistPropertyBag to allow an object to save or load its persistent data to some type of medium. The OLE persistence object interfaces are known to those skilled in the art. Detailed information on the OLE persistence object interface can be found in *Inside OLE*, 2nd edition, by Kraig Brockschmidt, Microsoft Press, Redmond Wash., 1995. A brief summary of the OLE persistence object interfaces are shown below in Table 1.

TABLE 1

| OLE Persistence object interfaces | Brief Description of the Interface |
|---|---|
| IPersistStorage | The object can read and write its information in a storage hierarchy in which the object is allowed to create additional substorages and streams to any depth it requires. The object can also open elements and hold their pointers outside the scope of calls to the interface. |
| IPersistStream | The object can read and write its information in a single stream and must do so within the scope of calls to this interface. |
| IPersistStreamInit | Same as IPersistStream, but this interface means the object would like to be informed when it is newly created and has no persistent state as yet. The member function for this purpose does not exist in IPersistStream. |
| IPersistFile | The object can read and write its information into a completely separate file (traditional or compound) outside the scope of the Structured Storage. |
| IPersistPropertyBag | The object can read and write object property information into a storage data structure. |

The standard OLE persistence mechanisms (IPersistStorage, etc.) do not allow for the saving of only object state differences. Nor do these mechanisms allow for object state loading in multiple steps. To manage the saving and loading of an object state in an inheritance situation, a new object-oriented persistence interface, IInheritable is introduced. The IInheritable interface works together with the existing OLE persistence interfaces to manage object inheritance during saving and loading. Rather than defining new persistent Save and Load type functions in the OLE interface, the object functions in the IInheritable interface change the meaning of subsequent calls to Save and Load functions on OLE IPersistStorage, IPersistStream, and any other persistence interfaces (e.g., the OLE IDataObject interface can be considered a persistence interface). However the IInheritable interface can also be used with other object-oriented persistence interfaces which do not use OLE persistence interfaces. In an illustrative embodiment of the present invention, the IInheritable interface is used with existing OLE interfaces to provide new and improved inheritance functionality. However, the IInheritable interface could also be used to provide inheritance with other object-oriented interfaces.

A summary of the new IInheritable persistence object interface is shown below in Table 2.

TABLE 2 object interface IInheritable: IUnknown
{
    HRESULT SetLoadState(INH_LOAD_STATE loadstate);
    HRESULT SetSaveState(BOOL fDeltaSave, BOOL fCanBeBase);
    HRESULT IsPropertyInherited(DISPID dispid);
    HRESULT SetPropertyInherited(DISPID dispid, BOOL fInherited);
}

TABLE 3 shows the IInheritable SetLoadState interface member.

IInheritable::SetLoadState
enum{    INH_LOAD_BASE,
        INH_LOAD_DERIVED,
        INH_LOAD_COMPLETE}
INH_LOAD_STATE;
HRESULT SetLoadState(INH_LOAD_STATE loadstate)

The IInheritable interface member SetLoadState shown in Table 3 sets the state of an object for subsequent load operations. The calls to SetLoadState are used in the following order: one or more calls with the loadstate parameter set to INH_LOAD_BASE, zero or one calls with the loadstate parameter INH_LOAD_DERIVED, and one call with the loadstate parameter set to INH_LOAD_COMPLETE. The INH_LOAD_DERIVED call can be skipped when using a persistence interface that does not require an OLE InitNew object type call to initialize a new (empty) derived object state. However, the object is not considered initialized until after the INH_LOAD_COMPLETE call is made.

The following values are legal for the loadstate parameter:
INH_LOAD_BASE This flag is passed before loading the initial or any subsequent base classes. If multiple base class states are being loaded, it occurs before each base class state is loaded.
INH_LOAD_DERIVED This flag is passed before loading or initializing the derived class state. One derived class state is loaded, and it is loaded after all base class states.
INH_LOAD_COMPLETE This flag is passed after the last state is loaded. It signals the end of loading the derived class state, and returns the object to normal OLE load or other object-oriented interface semantics. The object cannot be considered initialized until after this value is passed.

Table 4 shows the IInheritable SetSaveState interface member.

TABLE 4

IInheritable::SetSaveState
HRESULT SetSaveState(BOOL fDeltaSave, BOOL fCanBeBase)

The IInheritable interface member SetSaveState sets the object state for subsequent save operations. The save state determines what part of the object's persistent state is saved on a persistence interface (e.g., OLE IPersistStorage::Save). The indicated state is in effect until the next call to SetSaveState. A call with the parameters fDeltaSave and fCanBeBase both set to FALSE indicates that the normal OLE or other object-oriented save semantics are to be followed; this state should be reestablished immediately following the save.

If the OLE IPersistStorage is being used, the fSameAsLoad argument to the OLE IPersistStorage::Save interface member can only be TRUE if the save state is identical to the type of state used when loading from that storage.

The fDeltaSave and fCanBeBase parameters have the following effects:
fDeltaSave If TRUE, the object is directed to save only the difference between its current state and the base class state it was loaded with. In this case, the saved state will be loaded subsequent to loading base state. If FALSE, the entire state of the object is saved, including any base class state.
fCanBeBase If TRUE, the object saves its state in a format so that it can be loaded as a base object (e.g., after SetLoadState(INH_LOAD_BASE), as well as being loaded as derived state (fDeltaSave==TRUE) or full state (fDeltaSave==FALSE). Many objects will be able to ignore this flag, but it is provided so that objects can use a more efficient save format if being a base class is not required.

Table 5 shows the IInheritable IsPropertyInherited interface member.

TABLE 5

IInheritable::IsPropertyInherited
HRESULT IsPropertyInherited(DISPID dispid)

The IInheritable interface member IsPropertyInherited shown in Table 5 determines whether the object property identified by dispid is inherited from the base object class or not. If the return value is S_OK, the object property is inherited. If the return value is S_FALSE, the property is not inherited, and if the return value is E_NOTIMPL, the property does not support inheritance.

Table 6 shows the IInheritable SetPropertyInherited interface member.

TABLE 6

IInheritable::SetPropertyInherited
HRESULT SetPropertyInherited(DISPID dispid, BOOL fInherited)

The IInheritable interface member SetPropertyInherited shown in Table 6 sets the object property identified by dispid as inherited from the base. If the parameter fInherited is set to TRUE, the object should revert the value of the indicated object property to the value loaded from the base object class. In order to support this, objects should remember the base object class value when loaded, even if the derived state overrides it. If remembering the value is impossible or impractically inefficient, objects can return the flag S_BASEVALUEUNKNOWN, which indicates that the link to the base object class has been reestablished, but the base object class value is currently unknown. A calling subroutine can then chose to save and reload the object (which correctly restores the base value).

The return values include: S_OK, the object property's inheritance characteristics were successfully changed; E_NOTIMPL, the object property does not support inheritance; and S_BASEVALUEUNKNOWN which indicates that the inheritance characteristics were changed, but the value of the object property in the base object class has been lost and will not be correct until the object is reloaded (this return value can be used when ƒInherited is TRUE).

In an illustrative embodiment of the present invention, the IInheritable interface provides methods for creating, saving, and loading derived object classes.

Creating and Saving a Base Object Class

To prepare for the creation of derived object classes, one or more base object classes are created in memory and then saved in non-volatile storage in their respective persistent states. Non-volatile storage is storage such as hard disk drives, flash memory, and others that do not lose data when the power for computer system 10 (FIG. 1) is turned off. The object state information in the base object classes is carried across object lifetimes as the persistent state of the object. A persistent state occupies no volatile memory (but may be stored temporarily in volatile memory). The persistent states of the base objects are then used to created derived object classes.

One or more base object classes are created and saved in non-volatile storage in persistent states using the IInheritable interface and OLE persistent calls. However, object-oriented function calls other than OLE persistent calls could also be used with the IInheritable interface. In another embodiment of the illustrated invention, the one or more base object classes can be created in volatile memory and used to create derived object classes without first saving the base object classes in non-volatile storage in a persistent state.

The following pseudo-code in Table 7 uses IInheritable and OLE function calls and illustrates the creating and saving of base object classes in a base object persistent state in non-volatile storage.

TABLE 7

CoCreateInstance(rclsid, pUnkOuter, dwContext, iid, &pBaseObject); // OLE
pBaseObject->SetSaveState(FALSE,TRUE); //IInheritable
pBaseObject->Save(pStgBase, FALSE); // OLE
pBaseObject->SaveCompleted(NULL); // OLE
pBaseObject->SetSaveState(FALSE, FALSE); // IInheritable The pBaseObject is an object interface pointer to a base object class in memory, SetSaveState() is an IInheritable function call and CoCreateInstance(), Save(), SaveCompleted(), and are OLE function calls. However, other function calls to create and save base object classes could also be used.

As is shown in Table 7, a base object class is created in memory with the OLE function call CoCreateInstance (rclsid, pUnkOuter, dwContext, iid, &pBaseObject). The OLE CoCreateInstance(REFCLSID rclsid, LPUNKNOWN, pUnkOuter, DWORD, dwContext, REFIID iid, void, **ppv) function accepts five arguments where rclsid, pUnkOuter, dwContext, lid, and ppv are OLE object parameters known to those skilled in the art. For a complete explanation of the OLE arguments, see Inside OLE, Second Edition, by Kraig Brockschmidt, Microsoft Press, 1995, pp. 224–245.

CoCreateInstance() creates an instance of a base object class which is pointed to by the object interface pointer pBaseObject.

The IInheritable interface SetSaveState(BOOL ƒDeltaSave, BOOL ƒCanBeBaseFlag) function accepts two arguments, boolean flags ƒDeltaSave, and ƒCanBeBaseFlag. These boolean flags can have the value TRUE or FALSE.

Object saving is done in three different ways, depending on the SetSaveState() flags. If ƒDeltaSave==FALSE and ƒCanBeBase==FALSE, the object does persistent using normal OLE persistent methods without any regard to any object property inheritable from the IInheritable interface.

A first call to the IInheritable::SetSaveState interface member (i.e., BaseObject->SetSaveState(FALSE, TRUE)) sets the persistent environment to save the desired base object with inheritance provided by the IInheritable interface in a persistent state in non-volatile storage. The ƒDeltaSave flag is set to FALSE, indicating the entire state of the base object is to be saved, and ƒCanBeBaseFlag flag is set to TRUE indicating the object being saved is to be used as a base object class.

The OLE Save(ISstorage *pstg, BOOL ƒSameAsLoad) function takes two arguments: pstg, which is a pointer to the ISstorage structure which for the object to be stored, and ƒSameAsLoad which is a BOOLEAN flag that can take on the values of TRUE or FALSE. If ƒSameAsLoad is TRUE, the object can write changes incrementally, otherwise (i.e., FALSE), the object must completely rewrite all of its data every time it is changed.

A call (i.e., pBaseObject->Save(pStgBase, FALSE)), is made to the OLE Save() function to save the base object class in memory to non-volatile storage in persistent state. The pointer pStgBase points to the location in non-volatile storage where the persistent state of the base object class is located. This pointer will be used to create a derived object class from this base object class and will be explained below. With the ƒSameAsLoad flag set to FALSE, the base object class must completely rewrite all of its data to a persistent state in non-volatile storage every time it is changed. Rewriting the base object class data in its persistent state completely every time it is changed help ensure all changes in the base object class will be reflected in any derived object classes which are created.

The OLE SaveCompleted(IStorage *pstg) function takes one argument pstg, which is a pointer to the ISstorage for the object to be saved. The OLE SaveCompleted() function informs the object the overall procedure to save an object in its persistent state in non-volatile storage is complete. If pstg is NULL, the object can write any object elements. If pstg is non-NULL, the object releases its object pointers and re-opens its elements underneath the pstg pointer. The OLE call (i.e., pBaseObject->SaveCompleted(NULL)), to SaveCompleted() is made with a NULL pointer, so the base object can write to any object.

The second call (i.e., pBaseObject->SetSaveState (FALSE, FALSE)) to the IInheritable object interface member SetSaveState is done with the ƒDeltaSave and the ƒCanBeBase flags both set to FALSE. This indicates that base object class has been saved in a persistent state in non-volatile storage, and normal OLE save semantics are to be followed for other save requests from this point forward.

Creating and Saving a Derived Object Class

Figure 2:
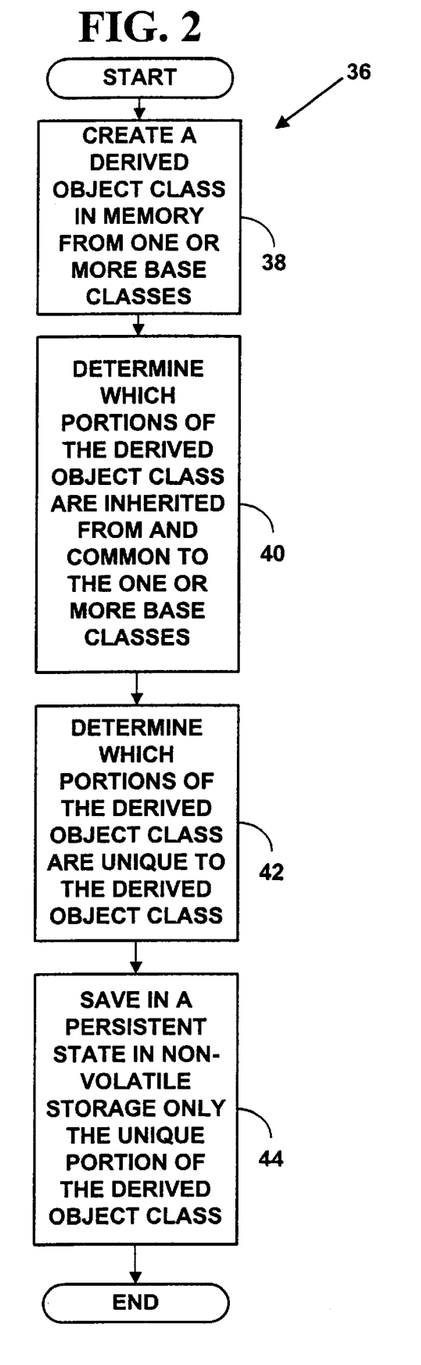
FIG. 2 is a flow diagram illustrating a method for creating and saving objects with inheritance.

FIG. 2 is a flow diagram illustrating a method 36 for creating and saving objects with inheritance. A derived object class is created in memory at step 38 using the persistent state of one or more base object classes stored in non-volatile storage. At step 40, it is determined which portions of the derived class object are inherited from, and thus common within, the base object class. At step 42, portions which are unique and specific to the derived object class are determined. When the derived object class is saved at step 44 in a persistent state in non-volatile storage, preferably only those portions unique to the derived object class (i.e., not including any of the base object class) are stored. This save a significant amount of computer resources (i.e., non-volatile storage space for the derived object classes). If desired, some of the common portions but less than the entire derived object class may also be saved in the persistent state.

The following pseudo-code shown in Table 8 is used for the creation step 38 of method 36 using the IInheritable interface and an existing object-oriented interface (OLE). However object-oriented interfaces other than OLE calls could also be used with the IInheritable interface.

TABLE 8

CoCreateInstance(rclsid, pUnkOuter, dwContext, iid,&pDerivedObject);// OLE
pDerivedObject->SetLoadState(INH_LOAD_BASE); // IInheritable
pDerivedObject->Load(pStgBase); // OLE
pDerivedObject->SetLoadState(INH_LOAD_DERIVED); //IInheritable
pDerivedObject->InitNew(pStgDerived); //OLE
pDerivedObject->SetLoadState(INH_LOAD_COMPLETE); // IInheritable To create an instance of a derived object class in memory at step, a call (i.e., CoCreateInstance( . . . &pDerivedObject)) to the OLE function CoCreateInstance() which was described above for the base object class is made for the derived object class. CoCreateInstance() creates an instance of a derived object class which is pointed to by the object interface pointer pDerivedObject.

The function SetLoadState(INH_LOAD_STATE loadstate) accepts one argument loadstate, the loadstate for subsequent load operations for an object. A first call to the IInheritable object interface function SetLoadState() (i.e., pDerivedObject->SetLoadState(INH_LOAD_BASE)) sets the persistent environment to load the desired base object with inheritance provided by the IInheritable interface.

The OLE function Load(IStorage *pstg) accepts one argument pstg, a pointer to persistent object data in non-volatile storage. The call to the OLE Load() function loads in memory the persistent state of the base object class pointed to by pStgBase from non-volatile storage.

In one embodiment of the present invention, the base object class associated with a derived object class is loaded first into memory from a persistent state in non-volatile storage with a call (i.e., pDerivedObject->Load(pStgBase)) to the OLE function Load(pStgBase). The pointer pStgBase which points to the persistent state of the base object class in non-volatile storage was determined when the base object class was saved (i.e., pBaseObject->Save(pStgBase, FALSE) call shown in Table 7 above). A second call (i.e., pDerivedObject->SetLoadState(INH_LOAD_DERIVED)) to the IInheritable object interface function SetLoadState() with a loadstate of INH_LOAD_DERIVED is used to set the persistent environment to load the desired derived object class with inheritance provided by the IInheritable interface.

The OLE InitNew() function call accepts one argument pstg which is a pointer to allocated object storage. The object pointer pSetgDerived (i.e., pstg) points to the allocated storage for the derived object that was previously allocated in memory. The call (i.e., pDerivedObject->InitNew (pSetgDerived)) to the OLE InitNew(IStorage *pstg) function initializes new object storage in memory where the derived object can write any incremental changes to its object information.

The last call (i.e., pDerivedObject->SetLoadState(INH_LOAD_COMPLETE)) to the IInheritable interface SetLoadState() function is used return the persistent environment to normal OLE persistent semantics. The derived object class is not initialized until after the call to SetLoadState() with the INH_LOAD_COMPLETE argument.

Managing Object Inheritance

The properties of base and derived object classes are typically managed by software development tools in an object-oriented programming language development environment such as that provided by Visual Basic. However, other object property management techniques could also be used, and the illustrative invention is not limited to Visual Basic software development tools. For example, a Visual Basic property browser manages the properties of derived object classes.

When the derived object class is created in memory at step 38, the fields in an IInheritable property table for the derived object class are set for each object property that is inherited from the base object class, and for each object property that is unique and specific to the derived object class. However, other inheritance data structures could also be used to store object properties and the IInheritable property table is just one possible implementation. Distinguishing inherited object properties allows only a "delta" for the derived object class to be saved, as will be described below.

For an object to determine which object properties included in the derived object class are inherited from, and common to the one or more base object classes at step 40, a call to the IInheritable interface IsPropertyInherited (DISPID dispid) function is made using the following pseudo-code as an illustration.

pDerivedObject->IsPropertyInherited(dispid); The IsPropertyInherited(DISPID dispid) function accepts one argument, dispid, an identifier of the desired property from the IInheritable property table. A value of S_OK is returned if the property is inherited from the base object class. The values in the property table for the derived object class were set with calls to the IInheritable interface IsPropertyInherited() function when the derived object class was created as was described above.

In an alternative embodiment of the present invention, when the derived object class is created, two separate IInheritable property tables are created, a first table containing only object properties inherited from one or more base objects, and a second table containing only object properties unique and specific to the derived object. The first and second tables would be then used for the determining steps 40 and 42 respectively, without or without calls to the IInheritable interface IsPropertyInherited() function.

When it desired to save a derived object class created in memory, only the part of the object state and object properties unique and specific to the derived object class, a so-called "delta" state between the base object class and the derived object class is saved. The derived object class is saved as a derived object persistent state in non-volatile storage at step 44. This is controlled by setting the fDelta flag in the IInheritable function SetSaveState() to TRUE to direct the object to save only its derived state.

The pseudo-code shown in Table 9 illustrates saving a derived object class that is stored in memory in a persistent state in non-volatile storage at step 44 using the IInheritable interface and an existing object-oriented interface (OLE). However, other object-oriented interfaces could also be used other than OLE.

TABLE 9 pDerivedObject->SetSaveState(TRUE,TRUE);//IInheritable
pDerivedObject->Save(pStgDerived, FALSE); //OLE
pDerivedObject->SaveCompleted(NULL);//OLE
pBaseObject->SetSaveState(FALSE, FALSE);//IInheritable The first call (i.e., pDerivedObject->SetSaveState(TRUE, TRUE)) to the IInheritable SetSaveState() function has the fDeltaSave and the fCanBeBase flags set to true, indicating the object is directed to save only the difference between its current state and the base object class state it was loaded with, and the object being saved can be loaded as a base state.

A call (i.e., DerivedObject->Save(pSetgDerived, FALSE)), is made to the OLE Save() function to save the derived object in memory to non-volatile storage in a persistent state. A call (i.e., pDerivedObject->SaveCompleted(NULL)), to the OLE SaveCompleted() made is made with pstg being NULL, so the derived object class can write to any object elements.

The second call (i.e., pDerivedObject->SetSaveState (FALSE, FALSE)) to the inheritable object interface SetSaveState() is done with the fDeltaSave and the fCanBeBase flags both set to FALSE indicating the persistent environment is to return to normal OLE operations.

Loading a Derived Object Class

Figure 3:
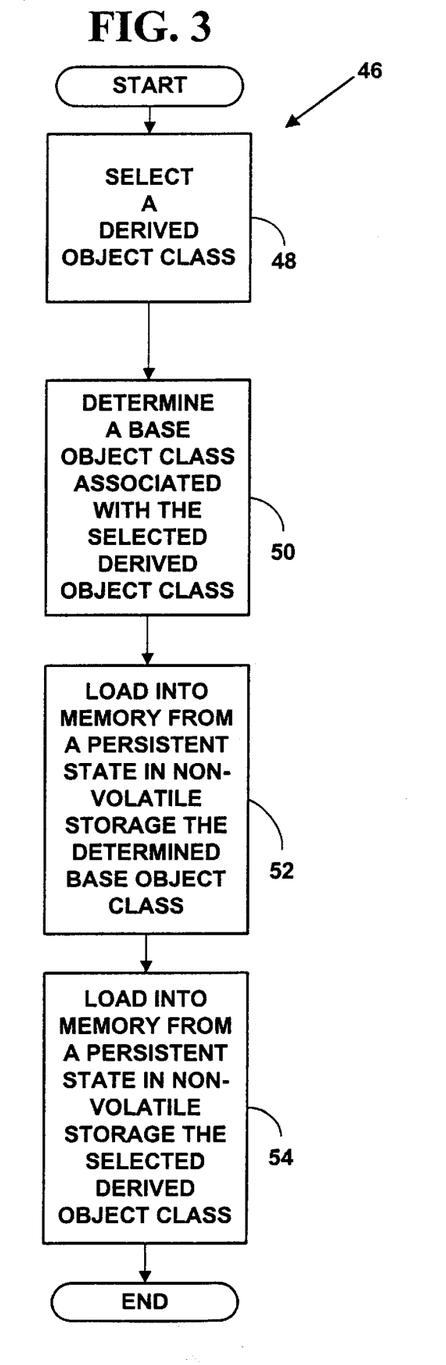
FIG. 3 is a flow diagram illustrating a method for loading objects with inheritance.

FIG. 3 is a flow diagram illustrating a method 46 for loading objects with inheritance. A derived object class is selected at step 48, and the base object class associated with the selected derived object class is determined at step 50. The base object class is loaded into memory from its persistent state in non-volatile storage at step 52. The derived object class is loaded into memory from its persistent state in non-volatile storage at step 54, thereby proving a complete derived object class in memory with a two-step loading process.

The following pseudo-code as shown in Table 10 is used for method 46 using the IInheritable interface and an existing object-oriented interface (OLE). However object-oriented interfaces other than OLE calls could also be used with the IInheritable interface.

TABLE 10 pDerivedObject->SetLoadState(INH_LOAD_BASE);
pDerivedObject->Load(pStgBase);
pDerivedObject->SetLoadState(INH_LOAD_DERIVED);
pDerivedObject->Load(pStgDerived);
pDerivedObject->SetLoadState(INH_LOAD_COMPLETE);

A call (i.e., pDerivedObject->SetLoadState(INH_LOAD_BASE)) to the IInheritable object interface function SetLoadState() sets the persistent environment to load the desired base object with inheritance provided by the IInheritable interface. A call (i.e., pDerivedObject->Load (pStgBase)) to the OLE function Load() function loads in memory the persistent state of the base object class pointed to by pStgBase from non-volatile storage. The pointer pStgBase was created when the base object class was saved in a persistent state in non-volatile storage (i.e., pBaseObject->Save(pStgBase)) as was described above.

A second call (i.e., pDerivedObject->SetLoadState (INH_LOAD_DERIVED)) to the IInheritable object interface function SetLoadState() sets persistent environment to load use the desired derived object class with inheritance provided by the IInheritable interface. A call (i.e., pDerivedObject->Load(pSetgDerived)) to the OLE function Load()function loads in memory the persistent state of the derived object class pointed to by pSetgDerived from non-volatile storage. The pointer pSetgDerived was created when the derived object class was saved in a persistent state in non-volatile storage (i.e., pBaseObject->Save (pSetgDerived, False) Table 9) as was described above.

The memory contains a complete derived object class. The last call ((i.e., pDerivedObject->SetLoadState(INH_LOAD_COMPLETE)) to the IInheritable interface SetLoadState() function is used to return the persistent environment to normal OLE persistent semantics. With the two step loading process, any changes made to a base object class are automatically reflected in the derived object classes.

Inheritance In Visual Forms

Figure 4:
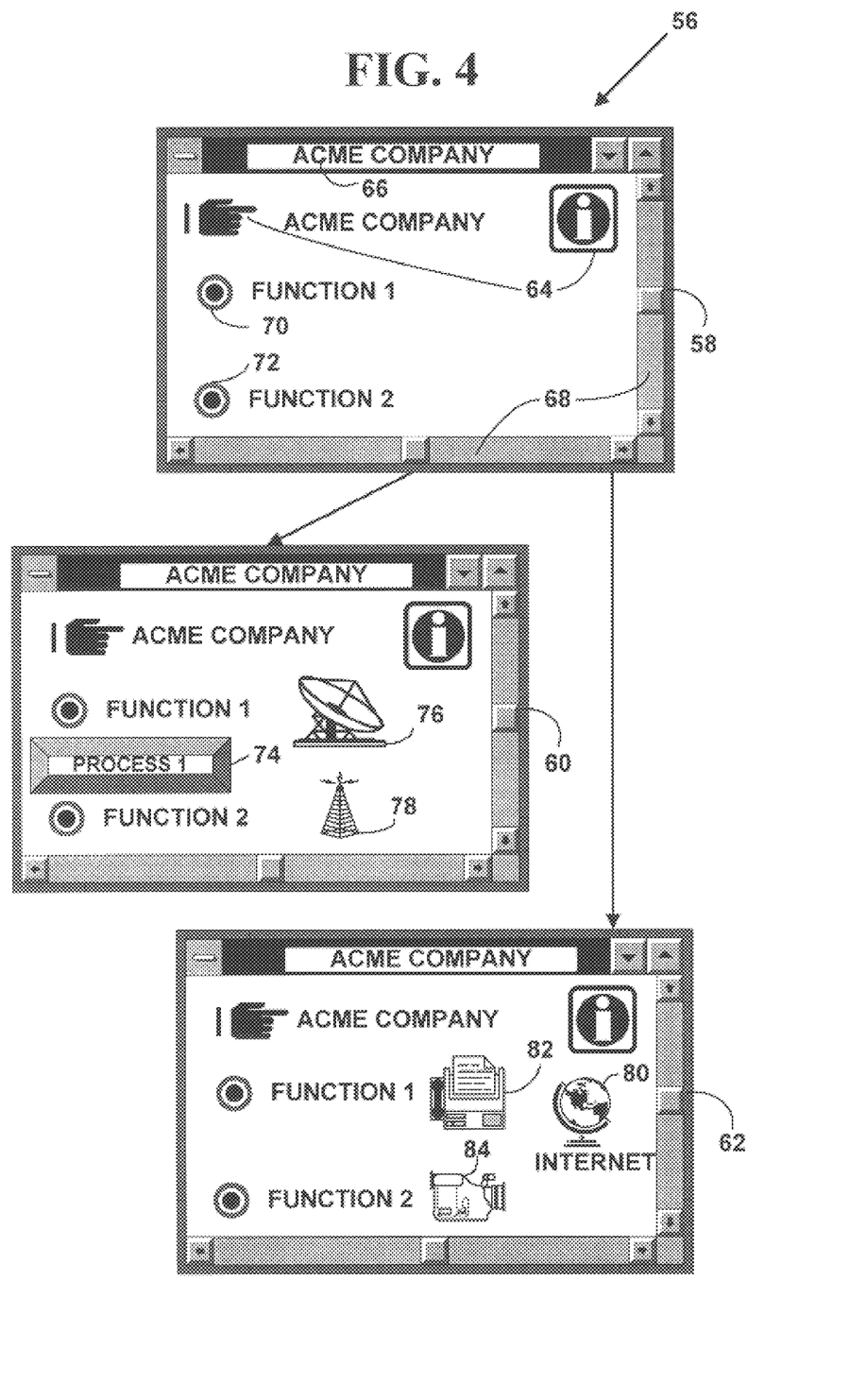
FIG. 4 is a block diagram illustrating graphical form inheritance for an illustrative embodiment of the present invention.

The objects which are used to create forms in a visual programming language such as Visual Basic typically provide a class hierarchy of forms. FIG. 4 is a block diagram illustrating graphical form inheritance. As is shown in FIG. 4, a class hierarchy of forms 56 includes one or more bases object class "parents" 58, and multiple derived object class "children" 60–62. The base object class forms are typically developed to include a generic form with a desired layout of graphical control icons 64, title bars 66, scroll bars 68, buttons 70–72, etc. (e.g., for a generic programming application). Derived object class form are created from the base object class forms and include additional graphical components 74–84 (e.g., for specific programming applications) For example, the base object class form 58 in FIG. 4 has two control icons 64, a title bar 66 (i.e., ACME Company), scroll bars 68, and two radio buttons 70,72 for functions 1 and 2, respectively. Derived object class form 60 is derived from the base object class form 58 and further includes a button 74 for process one, and two control icons 76–78 to designate functions 1 and 2 respectively. Derived object class form 62 is derived from the base object class 58 and further includes a globe control icon 80 (e.g., for access to the Internet), and two control icons 82–84 (different from those of derived object class form 60) to designate functions 1 and 2. Derived object class form 62 does not include button 74 used in derived object class form 60.

In one embodiment of the present invention, the IInheritable interface described above along with methods 36 and 46 are used to create a class hierarchy of graphical form objects including base object class forms and derived object class forms such as those shown in FIG. 4. However, the present invention is not limited to graphical form objects. When a derived object class form is saved, only the differences between the derived object class form and the base object class form are saved. For example, when derived object class form 60 is saved, only the object information corresponding to button 74, and icons 76–78 is what would be saved as a "delta" in a persistent state in non-volatile storage. The object information for the base object class form (58, 64–72) would not be stored with the derived object class form. Thus, a significant amount of computer resources are saved.

Saving a Derived Object Class From a Base Object Class

Figure 5:
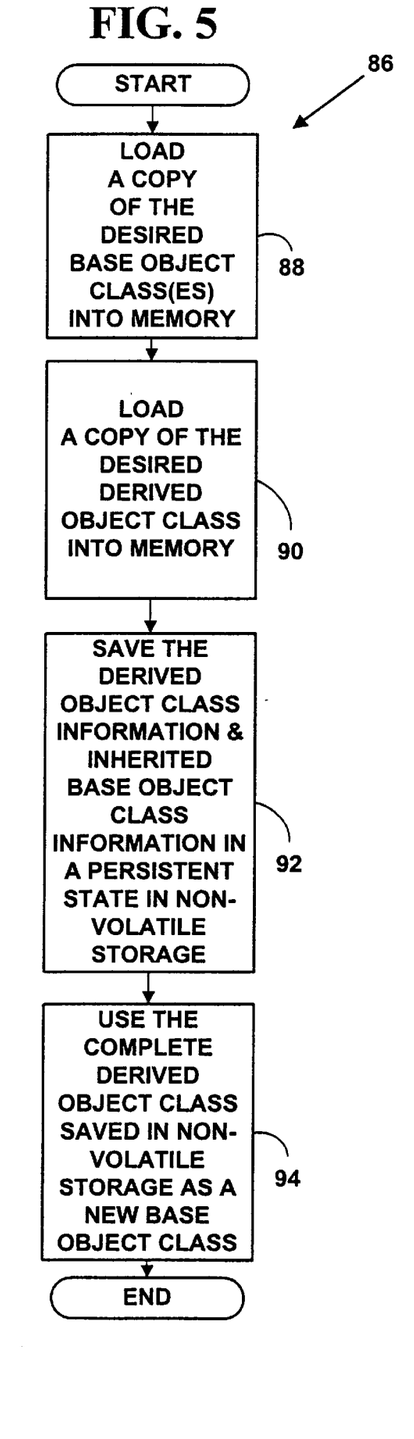
FIG. 5 is a flow diagram illustrating a method for creating a new base object class from a derived object class.

It is desirable at times to save the full state of a derived object class, rather than just the "delta" state. For example, derived object class form 60 in FIG. 4 may be used as a new base object class form. Form objects derived using derived object class form 60 as a base object class form object start with all of the characteristics (64–78) shown in derived object class form 60 (i.e., all the characteristics of the base object class 58 and the derived object class 60). FIG. 5 is a flow diagram illustrating a method 86 for creating new base object class from a derived object class. As is shown in FIG. 5, method 86 is used to save a derived object class from one or more base object classes from which it is derived. A copy of the one or more base object classes associated with a selected derived object class are loaded into memory at step 88 (e.g., from a persistent state in non-volatile storage). A copy of the derived object class is loaded into memory at step 90. A complete copy of the derived object class now exists in memory. The complete copy of the derived object class in memory includes all of the base object class information as well as the object information and state information unique to the derived object class. The complete copy of the derived object class in memory is saved as a new base object class in a persistent state in non-volatile storage at step 92. The persistent state of the derived object class in non-volatile storage is then used as a new base object class at step 94 to create new derived object classes. The derived object classes created from the new base object class start with all of the object information from the original base object class, and the original derived class.

To unlink a child derived object class from its parent base object class, and "flatten object inheritance" the following pseudo-code in Table 11 using the IInheritable interface and an existing object-oriented interface (OLE). However other object-oriented interfaces other than OLE could also be used with the IInheritable object interface.

TABLE 11

```
pDerivedObject->SetSaveState(FALSE, TRUE);
pDerivedObject->Save(pStgDerivedFull, FALSE);
pDerivedObject->SaveCompleted(NULL);
```

A call to the IInheritable::SetSaveState function (i.e., pDerivedObject->SetSaveState(FALSE,TRUE)) with the ƒDeltaSave flag set to FALSE indicating all of the derived object class is to be saved (i.e., not just the derived class delta), and the ƒCanbeBase flag set to TRUE, indicating this derived object class is being used as a base object class.

A call (i.e., pDerivedObject->Save(pSetgDerived, FALSE)), is made to the OLE Save() function to save the new base object in memory to non-volatile storage in a persistent state. With the OLE Save() ƒSameAsLoad flag set to FALSE, the derived object class must now completely rewrite all of its data to a persistent state in non-volatile storage every time it is changed instead of just writing the difference since this derived object class will become a new base object class. The OLE call (i.e., pDerivedObject->SaveCompleted(NULL)), to SaveCompleted() is made with pstg being NULL, so the derived object class can write to any object elements. Thus, the derived object class includes all of the object information of its base object class parent as well as its unique object information. The derived object class can now be used as a new base object class.

Base Object Class and Derived Object Class Sub-objects

The IInheritable interface can be used by any sub-objects within a derived or base object class to inherit object information. Sub-objects, like OLE or ActiveX controls, are used to add additional functionality to a base object class or a derived object class. OLE or ActiveX controls are objects with properties such as color and shape, and event notifications capabilities (e.g., "someone has clicked on me"). OLE controls are known to those skilled in the art. For more information on OLE controls see *OLE Controls Inside Out*, by Adam Denning, Microsoft Press, Redmond, Wash., 1995. However, sub-objects other than OLE controls can also be used with the base and derived object classes respectively.

If the sub-objects use IInheritable interface, they can also participate in the inheritance. The top-level containing object class (i.e., base or derived) simply needs to forward IInheritable calls onto contained sub-objects recursively. In this way the sub-objects can participate in the inheritance in the correct way.

Figure 6:
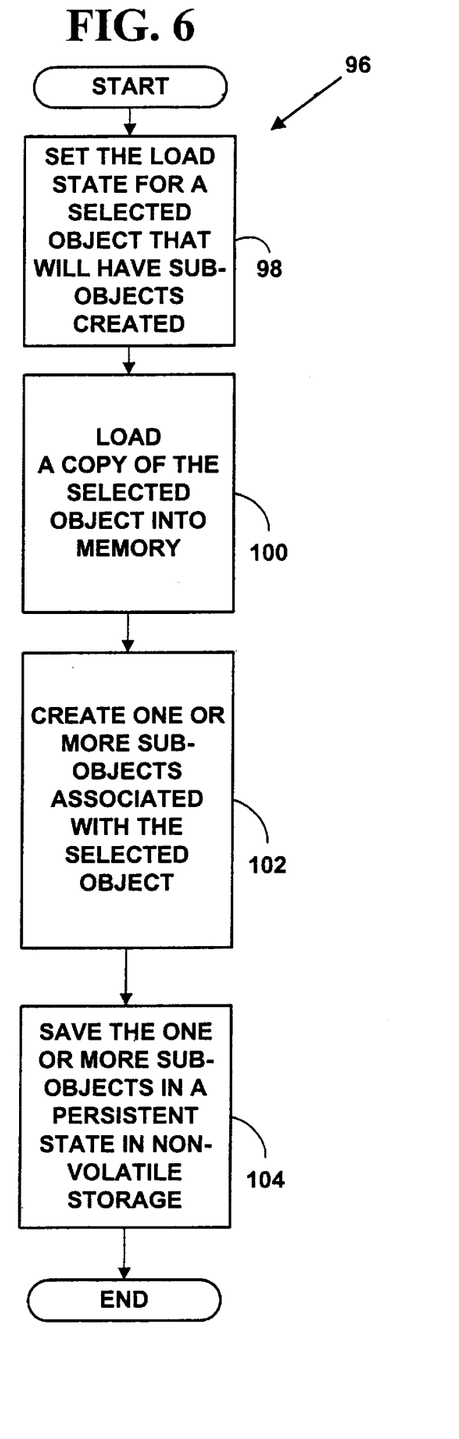
FIG. 6 is a flow diagram illustrating a method for creating sub-objects with inheritance.

FIG. 6 is a flow diagram illustrating a method 96 for creating sub-objects with inheritance. Method 96 illustrates a method of creating a sub-objects with inheritance using the IInheritable interface. Method 96 includes setting an object load state at step 98 for all sub-objects that will be created, the object state setting including setting flags to indicate if the sub-objects is inheritable by other objects. An object (i.e., a base or derived object) class is loaded into memory at step 100 (e.g., from a persistent state in non-volatile storage) and one or more sub-objects are created at step 102 and associated with the object loaded into memory. The sub-objects are saved in a persistent state in non-volatile storage at step 104.

As an example, the pseudo-code shown below in Table 12 includes a base object class with a first sub-object (available to the derived object class) and a derived object class that introduces a second sub-object (not available to the base object class). Indented code indicates calls made for the respective sub-objects.

TABLE 12

```
pBaseObject->SetLoadState(INH_LOAD_BASE);//IInheritable
pBaseObject->Load(pStgBase);//OLE
    CoCreateInstance(..., &pSubObj1);//OLE create 1st sub-object
    // sub-object attached to base object
    pSubObj1->SetLoadState(INH_LOAD_BASE);//IInheritable
    pSubObj1->Load(pStgBaseSubObj1);//OLE
pDerivedObject->SetLoadState(INH_LOAD_DERIVED);//IInheritable
    pSubObj1->SetLoadState(INH_LOAD_DERIVED);//IInheritable
    //sub-object 1 inheritable by derived object class
pDerivedObject->Load(pStgDerived);//OLE
    pSubObj1->Load(pStgDerivedSubObj1);//OLE
    CoCreateInstance(..., &pSubObj2);//OLE create 2nd sub-object
    // sub-object attached to derived object
```

TABLE 12-continued

```
// No SetLoadState needed on pSubObj2, since it has no base
// object, only inheritable by the derived object class.
    pSubObj2->Load(pStgDerivedSubObj2);//OLE
pDerivedObject->SetLoadState(INH_LOAD_COMPLE-TE);
//IInheritable
    pSubObj1->SetLoadState(INH_LOAD_COMPLETE);//IInheritable
```

In the pseudo-code shown in Table 12 above, the object state is set at step 98, indicating a base object class is going to have sub-objects (i.e., pBaseObject->SetLoadState(INH_LOAD_BASE)). The base object class is loaded into memory (i.e., pBaseObject->Load(pStgBase)) at step 100. A sub-object is created at step 102 that is associated with the base object class (i.e., CoCreateInstance( . . . , &pSubObj1), pSubObj1->SetLoadState(INH_LOAD_BASE), pSubObj1->Load(pStgBaseSubObj1)). The sub-object associated with the base object class is saved as a persistent state in non-volatile storage at step 104 (Not shown in the pseudo-code above). Sub-object-1 associated with the base object class is available to be inherited by any derived object classes.

Referring again to the pseudo-code above, the object state is reset at step 98, indicating a derived object class is going to have sub-objects (i.e., pBaseObject->SetLoadState (INH_LOAD_DERIVED)). The derived object class is loaded into memory at step 100 (i.e., pBaseObject->Load (pStgBase)). A sub-object is created at step 102 that is associated with the derived object class (i.e., CoCreateInstance( . . . , &pSubObj2), pSubObj2->Load (pStgBaseSubObj2)). The sub-object associated with the derived object class is saved as a persistent state in non-volatile storage at step 104 (Not shown in the pseudo-code above). Sub-object-2 associated with the derived object class is not visible to the base object class, and can not inherit object information from the base object class.

The only requirement on any sub-objects created is that they support the IInheritable or similar interface. The calls to each of the respective IInheritable and OLE functions were explained in detail above and are used in a similar manner for the two sub-objects (i.e., SubObj1 under the base object class, and SubObj2 under the derived object class).

Adding Inheritance to Existing Object Classes

The IInheritable interface allows inheritance to be used by existing objects classes. However, object property inheritance for existing objects (i.e., that existed without using the IInheritable interface) is supported only to the extent that the object writes properties to a property bag (e.g., an OLE IPersistPropertyBag). Object properties written to a property bag support different levels of inheritance, depending on the object property. These include the levels shown in Table 13. However, more or fewer levels of inheritance could also be used.

TABLE 13

1. Templating. The value of the property is copied once to the derived object class. Changes to the property in the base object class after the derived object class is created do not affect the derived control. Object properties which do not support OLE IPersistStream or IInheritable fall into this category.

2. Derivation until changed. The value of the property is obtained from the base object class unless it has been changed in the derived object class. If the value has not be changed in the derived object class, changes to the base object class propagate to the derived object class. Once the value has changed in the derived object class, changes to the property TABLE 13-continued in the base object have no effect. The link to the base object class property cannot be reestablished. Properties that are not accessible via OLE IDispatch fall into this category.

3. Full Derivation. This is the same as the Derivation Until Changed, but the link to the base object class property can be viewed and reestablished at any time via a property browser. Properties which are accessible via OLE (Dispatch with the same name as they are written to an OLE property bag fall into this category.

Figure 7:
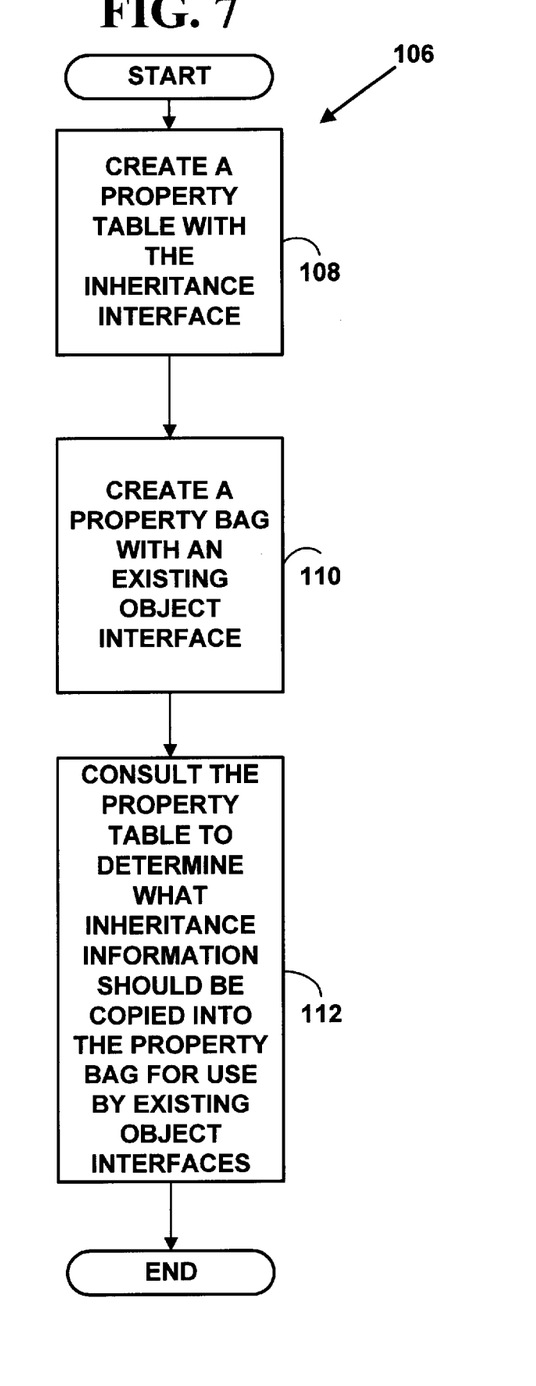
FIG. 7 is a flow diagram illustrating a method for adding inheritance to existing object classes.

FIG. 7 is a flow diagram illustrating a method 106 for adding inheritance to existing object classes. An object from an existing object class using the IInheritable interface creates a first property data structure at step 108. The first property data structure, called a property table, contains inheritance information about each object property of the object. The fields in the IInheritable interface property table are shown below in Table 14. However, more or fewer fields can also be used in the IInheritable property table.

TABLE 14

Name: (string) The name of the object property.
Dispid: (long) The dispid of the object property, if it is a property that is retrievable/settable via OLE IDispatch. This is obtained from the name by calling OLE IDispatch::GetIDsOfNames interface. It is set to DISPID_UNKNOWN if this property has no corresponding dispid.
    IsInherited: (boolean) Indicates if this property is inherited from the base object class.
    BaseValue: (variant or stream) Indicates the base calls instance value of this property. For object properties, a persisted stream representation (obtained via OLE IPersistStream) of the object is stored.

An object using the IInheritable interface for inheritance need not support per-property setting, or may only allow selected object properties to be set, and indicates this fact by returning the value E_NOTIMPL from the IInheritable property functions as appropriate.

To use inheritance, an existing object creates a second property data structure at step 110 with an object interface other than the IInheritable interface (e.g., with OLE persistence interface). The second property data structure, called a property bag, is conceptually similar to the IInheritable property table described above, is normally used to store object properties for an particular object interface.

In an illustrative embodiment of the present invention, the existing object is first asked to create and then save object properties into a property bag with the OLE IPersistPropertyBag::Save() function with the ƒSaveAllProperties flag set to TRUE, so that all object properties for the base object class are saved in the property bag. However, other functions and object-oriented interfaces could also be used to save objects in the property bag.

To determine what object properties are inherited and what object properties are not inherited, the IInheritable property table is consulted at step 112. If an object property being saved in the property bag is in the property table, the IsInherited flag in the property table is TRUE, and the value being saved is the same as the BaseValue in the property table, then a write of the object property into the property bag is not done since the object property is inherited. Otherwise, the object property is not inherited and is passed on and written as a normal OLE persistent object into the property bag. (If IsInherited is TRUE but the written value is different than BaseValue in the property table, something has changed the value of the object property and IsInherited is changed to FALSE in the property table). The property bag can then be used by other object interfaces (i.e., other object interfaces which normally interact with the OLE interfaces) to determine inheritance information without any modifications to the existing object interfaces.

The IInheritable interface also allows the hundreds of existing control objects to cleanly and easily participate in inheritance. It also reduces the amount of work for developers; unless they want to handle the details of inheritance themselves, by implementing the IInheritable interface, they can rely on the default control object implementation. This also increases reliability and decreases code size by having a single (or a few) implementations of IInheritable, instead of many.

For OLE and ActiveX controls, a control object (i.e., a X-object) for a control can implement IInheritable on behalf of the control, using IDispatch and property bags produced by the control to manage base and derived object states.

The implementation of IInheritable interface in a X-object is also simple, and it only causes overhead if IInheritable functions are called. Once the inheritance is flattened, the X-object passes persistent calls into the object and does not need to get involved.

To implement the IInheritable interface, the X-object maintains a property data structure of the control's properties (i.e., the property bag described above) For each property, it stores the dispid, base object class value, and a Boolean inherited flag as was described above for the IInheritable property table (Table 14).

Implementation of the IInheritable Interface

The illustrative embodiment of the present invention is an object-oriented interface IInheritable implemented in the C++ programming language which provides inheritance in graphical forms and other visual programming objects for visual programming languages like Visual Basic and is used in connection with OLE and ActiveX. However, the invention is not limited to implementation in C++, visual programming graphical form objects, visual programming languages, or use with OLE or ActiveX. The present invention can also be used in other object-oriented frameworks and object-oriented programming environments which allow inheritance by derived object classes from base object classes and is also useful for providing object inheritance for object-oriented control applications created for the use on the Internet, or an intranet (e.g., ActiveX).

It should be understood that the programs, processes, and methods described herein are not related or limited to any particular type of computer apparatus, unless indicated otherwise. Various types of general purpose or specialized computer apparatus may be used with or perform operations in accordance with the teachings described herein. For example, the steps of the flow diagrams may be taken in sequences other than those described, and the claims should not be read as limited to the described order unless stated to that effect.

In view of the wide variety of embodiments to which the principles of our invention can be applied, it should be understood that the illustrated embodiments are exemplary only, and should not be taken as limiting the scope of the invention. Rather, I claim as my invention all such embodiments as come within the scope and spirit of the following claims and equivalents thereto:

I claim:

1. A computer implemented method of creating sub-objects in an object-oriented programming environment, the method comprising:

setting the object state for a selected object class for which at least one sub-object is created, the object state setting including an indication whether sub-object data values for any sub-objects created for the selected object class are inheritable or not inheritable by other objects;

loading the selected object class into memory;

creating at least one sub-object associated with the selected object class in memory; and saving the sub-object data values for any inheritable sub-object created for the selected object class in a sub-object persistent state in non-volatile storage.

2. A computer readable medium having stored therein instructions for causing a computer to execute the method of claim 1.

3. The method of claim 1 wherein the setting includes setting the object state for a selected object class so that sub-object data values for any sub-objects created for the selected object class are not inheritable by other objects.

4. The method of claim 1 wherein the setting includes setting the object state for a selected object class so that sub-object data values for any sub-objects created for the selected object class are inheritable by other objects.

5. A computer-implemented method for creating and saving an object from an object-oriented application, the method comprising:

creating a derived object class from at least one base object class, wherein the derived object class has associated derived object class state information, and wherein the base object class has associated base object class state information;

determining which portions of the derived object class state information are common to the derived object class state information and base object class state information;

determining which portions of the derived object class state information are unique to the derived object class state information; and saving in a derived object class persistent state at least the unique portions of the derived object class state information, but less than the entire base object class state information.

6. A computer-readable storage medium having stored therein instructions for causing a computer to execute the method of claim 1.

7. The method of claim 5 wherein saving comprises saving only the unique portions of the derived object class state information.

8. The method of claim 5 further including:

creating in memory the base object class; and using the base object class created in memory instead of a base object class stored in non-volatile storage to create the derived object class.

9. The method of claim 5 wherein the base object class state information is stored in a base object class persistent state in a base object class database.

10. The method of claim 5 wherein creating includes:

creating in memory a pointer to the derived object class in memory;

allocating in memory storage for an instance of the derived object class in memory; and setting the pointer to point to the storage in memory allocated for the instance of the derived object class.

11. The method of claim 5 wherein the base object classes and the derived object classes are graphical form objects used in a visual programming language, the graphical form objects including object-oriented data for display as a graphical form on a display device in a computer system.

12. A computer-implemented method for loading a derived object class of an object-oriented application from non-volatile storage into memory, the method comprising:
selecting a derived object class for loading into memory;
determining at least one base object class which is associated with the selected derived object class;
loading object state information for the associated base object class into memory from a base object class persistent state stored in non-volatile storage;
loading object state information for the selected derived object class into memory from a derived object class persistent state stored in non-volatile storage; and
storing a complete derived object class in memory that includes object state information inherited from the base object class persistent state and object state information from the derived object class persistent state.

13. A computer readable medium having stored therein instructions for causing a computer to execute the method of claim 12.

14. The method of claim 12 further comprising:
saving the object state information included by the complete derived object class in memory in non-volatile storage.

15. The method of claim 12 wherein loading object state information for the associated base object class includes:
allocating storage in memory for an instance of the base object class without creating an instance of the base object class; and
creating an instance of the base object class in the allocated storage in memory.

16. The method of claim 12 wherein the base object classes and the derived object classes are graphical form objects used in a visual programming language, the graphical form objects including object-oriented data for display as a graphical form on a display device in the computer system.

17. A computer-implemented method for creating a new base object class of an object-oriented application from a derived object class of the application, the method comprising:
loading object state information for an original base object class into memory from a base object class persistent state in non-volatile storage;
loading object state information for an original derived object class associated with the original base object class into memory from a derived object class persistent state stored in non-volatile storage;
storing a complete derived object class in memory that includes object state information inherited from the original base object class and object state information from the original derived object class; and
saving the object state information included in the complete derived object class as new object state information for a new base object class in a new base object class persistent state in non-volatile storage.

18. A computer readable medium having stored therein instructions for causing a computer to execute the method of claim 17.

19. The method of claim 17 further comprising:
creating a plurality of new derived object classes with the new base object class wherein each of the plurality of new derived object classes inherits new object state information from the new base object class.

20. The method of claim 17 wherein the new base object class is no longer associated with the original base object class.

21. The method of claim 17 wherein the base object classes and the derived object classes are graphical form objects used in a visual programming language, the graphical form objects including object-oriented data for display as a graphical form on a display device in a computer system.

22. A computer-implemented method for creating and saving form objects of a visual programming language, the method comprising:
creating a derived object class form from a base object class form, wherein the derived object class form has associated form condition values, and wherein the base object class form has associated form condition values;
determining which portions of the derived object class form condition values are common to the derived object class form condition values and the base object class form condition values;
determining which portions of the derived object class form condition values are unique to the derived object class form condition values; and
saving in non-volatile storage in a derived object class form persistent state at least those unique portions of the derived object class form condition values, but less than the entire base object class form condition values.

23. A computer readable medium having stored therein instructions for causing a computer to execute the method of claim 22.

24. In a visual programming language with a plurality of object-oriented applications, the object-oriented applications including a plurality of base object class forms and derived object class forms having object-oriented data for creating graphical forms displayed on a display device in a computer system, the method comprising:
selecting a derived object class form;
determining at least one base object class form associated with the selected derived object class form;
loading base object class form condition values for at least one base object class form associated with the selected derived object class form into memory from a base object class form persistent state stored in non-volatile storage;
loading derived object class form condition values for the selected derived object class form into memory from a derived object class form persistent state stored in non-volatile storage; and
storing a complete derived object class form in memory that includes base object class form condition values from the base object class form persistent state and derived object class form condition values from the derived object class form persistent state.

25. A computer readable medium having stored therein instructions for causing a computer to execute the method of claim 24.

26. The method of claim 24 further comprising:
saving the form condition values included by the complete derived object class form in memory into non-volatile storage.

27. A computer-implemented method for providing object inheritance information, the method comprising:
modifying status values for object information for a base object class;
saving the modified status values for the base object class in a base object class persistent state;
selecting a derived object class associated with the base object class;
loading the modified status values for the base object class from the base object class persistent state;

loading status values for the selected derived object class from a derived object class persistent state; and storing in memory a new derived object class that includes the modified status values for the object information inherited from the base object class persistent state and the status values for the object information from the derived object class persistent state.

28. A computer readable medium having stored therein instructions for causing a computer to execute the method of claim 27.

29. A computer readable medium having stored thereon instructions for an object information inheritance interface of an object, the interface including a plurality of interface members usable to manipulate inheritance of object information for the object, the instructions comprising:

- a first interface member for setting a save state indicating object information to be saved;
- a second interface member for setting a load state indicating object information to be loaded;
- a third interface member for marking object information inherited from another object; and
- a fourth interface member for determining whether selected object information has been inherited from another object.

30. A computer implemented method for adding inheritance of property state values to an existing object class, the method comprising:

- creating a first property data structure containing information about inheritance of property state values for an existing object class;
- creating a second property data structure for the existing object class, such second property data structure selectively storing the property state values for the existing object class; and
- consulting the first property data structure to determine what property state values for the existing object class should be saved in the second property data structure;
- whereby inheritance of property state values for the existing object class is added to the existing object class through the second property data structure.

31. A computer readable medium having stored therein instructions for causing a computer to execute the method of claim 30.

32. The method of claim 30 wherein the first property data structure is a property table and the second property data structure is a property bag.

33. The method of claim 30 further comprising:

- using the second property data structure to determine property state values for the existing object class.

* * * * *